United States Patent
Barzik et al.

(10) Patent No.: US 9,916,275 B2
(45) Date of Patent: Mar. 13, 2018

(54) PREVENTING INPUT/OUTPUT (I/O) TRAFFIC OVERLOADING OF AN INTERCONNECT CHANNEL IN A DISTRIBUTED DATA STORAGE SYSTEM

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Dan Cohen, Nataf (IL); Osnat Shasha, Holon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 14/641,889

(22) Filed: Mar. 9, 2015

(65) Prior Publication Data
US 2016/0267040 A1    Sep. 15, 2016

(51) Int. Cl.
G06F 13/00      (2006.01)
G06F 13/42      (2006.01)
G06F 3/06       (2006.01)

(52) U.S. Cl.
CPC .......... G06F 13/4221 (2013.01); G06F 3/067 (2013.01); G06F 3/0611 (2013.01);
(Continued)

(58) Field of Classification Search
CPC .. G06F 13/4221; G06F 3/0611; G06F 3/0635; G06F 3/067; G06F 3/0613; G06F 2206/1012
See application file for complete search history.

(56) References Cited

U.S. PATENT DOCUMENTS 6,282,561 B1 *   8/2001   Jones ................... G06F 9/5011
                                                    718/104
6,466,978 B1 *   10/2002  Mukherjee .............. G06F 3/061
                                                    348/E5.008
(Continued)

FOREIGN PATENT DOCUMENTS

CN          104219298          12/2014

OTHER PUBLICATIONS

"A Hierarchical Multipath Approach to QoS Routing: Performance and Cost Evaluation" byScott Scongwook Lee, Shirshanka Das, Giovanni Pau, and Matio Gerla, IEEE 2003.*
(Continued)

Primary Examiner — Jing-Yih Shyu
(74) Attorney, Agent, or Firm — Griffiths & Seaton PLLC

(57) ABSTRACT

Methods, computing systems and computer program products implement embodiments of the present invention that include configuring distributed storage system resources for a distributed storage system. Examples of the storage system resources include a plurality of network segments, one or more network devices coupled to the network, and multiple nodes coupled to the network, the nodes including both frontend and backend nodes. Upon receiving, by a given frontend node in the distributed storage system, an input/output (I/O) request, one or more of the distributed storage system resources required to process the I/O request are identified, and a respective load that the I/O request will generate on each of the identified distributed storage system resources is calculated. The distributed storage system processes the I/O request upon detecting that the respective loads are less than respective available capacities of the identified distributed storage system resources.

11 Claims, 3 Drawing Sheets

(52) U.S. Cl.
CPC .......... *G06F 3/0613* (2013.01); *G06F 3/0635* (2013.01); *G06F 2206/1012* (2013.01)

(56) References Cited

U.S. PATENT DOCUMENTS

| | | | |
|---|---|---|---|
| 8,880,657 B1 | 11/2014 | Angrish et al. | |
| 9,274,710 B1* | 3/2016 | Oikarinen | G06F 3/061 |
| 2002/0124137 A1* | 9/2002 | Ulrich | G06F 3/0613 |
| | | | 711/113 |
| 2002/0156891 A1* | 10/2002 | Ulrich | G06F 17/30067 |
| | | | 709/225 |
| 2008/0253290 A1* | 10/2008 | Schollmeier | H04L 45/00 |
| | | | 370/237 |
| 2013/0107712 A1* | 5/2013 | Allan | H04L 45/24 |
| | | | 370/235 |
| 2013/0138764 A1 | 5/2013 | Satapathy | |
| 2013/0151683 A1 | 6/2013 | Jain et al. | |
| 2013/0318228 A1* | 11/2013 | Raja | G06F 3/0635 |
| | | | 709/224 |
| 2014/0229673 A1 | 8/2014 | Colgrove et al. | |
| 2014/0317059 A1 | 10/2014 | Lad et al. | |
| 2014/0337391 A1 | 11/2014 | Starovoitov et al. | |
| 2014/0365622 A1 | 12/2014 | Iyengar et al. | |
| 2015/0058293 A1* | 2/2015 | Kobayashi | G06F 3/0607 |
| | | | 707/634 |
| 2015/0058498 A1 | 2/2015 | Lee et al. | |
| 2015/0088827 A1* | 3/2015 | Xu | G06F 17/30215 |
| | | | 707/634 |
| 2015/0106420 A1* | 4/2015 | Warfield | H04L 41/5077 |
| | | | 709/201 |
| 2015/0280959 A1* | 10/2015 | Vincent | H04L 67/1097 |
| | | | 709/203 |
| 2016/0105343 A1* | 4/2016 | Janarthanan | H04L 43/0876 |
| | | | 370/252 |
| 2016/0234297 A1 | 8/2016 | Ambach et al. | |
| 2016/0308965 A1* | 10/2016 | Yamakawa | H04L 41/0823 |

OTHER PUBLICATIONS

Thereska et al., "IOFlow: A Software-Defined Storage Architecture" pp. 182-196, Proceedings of the Twenty-Fourth ACM Symposium on Operating Systems Principles, Nov. 2013. ACM.

Huang et al., "MobiCloud: building secure cloud framework for mobile computing and communication" pp. 27-34, Fifth IEEE International Symposium on Service Oriented System Engineering (SOSE), 2010. IEEE.

* cited by examiner

PREVENTING INPUT/OUTPUT (I/O) TRAFFIC OVERLOADING OF AN INTERCONNECT CHANNEL IN A DISTRIBUTED DATA STORAGE SYSTEM

FIELD OF THE INVENTION

The present invention relates generally to storage systems, and specifically to a method for managing a back-end interconnect channel in a distributed storage system.

BACKGROUND

A distributed storage system (also known as a distributed data store) store is a computer network where data is stored on more than one node, often in a replicated manner. A distributed storage system can be implemented as a clustered file system, which is shared by being simultaneously mounted on multiple servers (also known as nodes). Clustered file systems can provide features like location-independent addressing and redundancy which improve reliability or reduce the complexity of the other parts of the cluster.

The description above is presented as a general overview of related art in this field and should not be construed as an admission that any of the information it contains constitutes prior art against the present patent application.

SUMMARY

There is provided, in accordance with an embodiment of the present invention a method, including configuring distributed storage system resources for a distributed storage system, receiving, by the distributed storage system, an input/output (I/O) request, identifying one or more of the distributed storage system resources required to process the I/O request, calculating a respective load that the I/O request will generate on each of the identified distributed storage system resources, and processing the I/O request upon detecting that the respective loads are less than respective available capacities of the identified distributed storage system resources.

There is also provided, in accordance with an embodiment of the present invention a distributed storage system, including multiple distributed storage system resources including a network and multiple nodes coupled to the network, a given node being configured to receive an input/output (I/O) request, to identify one or more of the distributed storage system resources required to process the I/O request, to calculate a respective load that the I/O request will generate on each of the identified one or more distributed storage system resources, and to process the I/O request upon detecting that the respective one or more loads are less than respective one or more available capacities of the one or more identified distributed storage system resources.

There is further provided, in accordance with an embodiment of the present invention a computer program product, the computer program product including a non-transitory computer readable storage medium having computer readable program code embodied therewith, the computer readable program code including computer readable program code configured to arrange distributed storage system resources for a distributed storage system, computer readable program code configured to receive an input/output (I/O) request, computer readable program code configured to identify one or more of the distributed storage system resources required to process the I/O request, computer readable program code configured to calculate a respective load that the I/O request will generate on each of the identified distributed storage system resources, and computer readable program code configured to processing the I/O request upon detecting that the respective loads are less than respective available capacities of the identified distributed storage system resources.

BRIEF DESCRIPTION OF THE DRAWINGS

The disclosure is herein described, by way of example only, with reference to the accompanying drawings, wherein.

DETAILED DESCRIPTION OF EMBODIMENTS

A distributed storage system comprising multiple nodes typically uses an interconnect channel (also known as a backend channel) for intra-node communication. When an input/output (I/O) request arrives via a frontend channel (e.g., iSCSI), the node receiving the I/O request generates traffic over the backend channel in order process the request. In addition, other processes might generate additional traffic over the backend channel.

There may be instances when the available bandwidth over the backend channel is limited in ways that could result in its physical limitations being the actual bottleneck in the system. In these instances, messages sent over the backend channel may be repeatedly dropped, thereby resulting in critical intra-cluster traffic being lost, and system failures.

Embodiments of the present invention provide systems and methods for scheduling I/O requests in a distributed storage system in order to prevent overloading the interconnect channel. As described hereinbelow, an I/O request is received, and one or more resources in a distributed storage system, that are required to process the I/O request, are identified. In embodiments described herein, examples of distributed storage system resources include nodes (e.g., servers), network segments and network devices such as network switches and routers. Upon identifying the required resources, a respective load that the I/O request will generate on each of the identified distributed storage system resources is calculated, and the I/O request is processed upon detecting that the respective loads are less than respective available capacities of the identified distributed storage system resources.

Distributed storage systems implementing embodiments of the present invention enable nodes to prioritize backend traffic generated by critical internal processes over backend traffic generated by user operations, thereby enabling the system to maintain its health and sustainability. Additionally, by calculating how many I/O operations can be handled at any given moment, the distributed storage system can handle I/O requests more efficiently without straining system resources.

Figure 1:
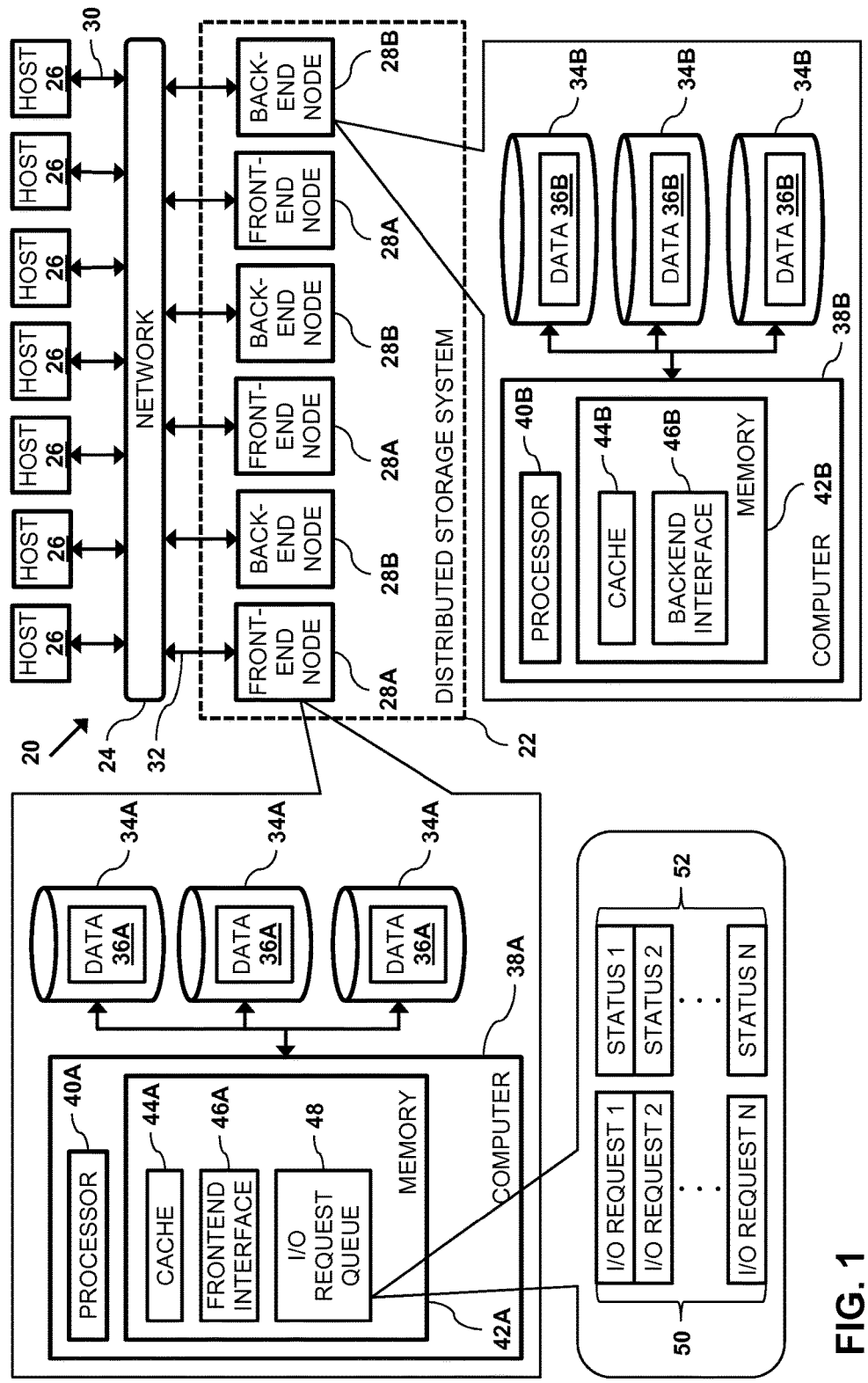
FIG. 1 is a block diagram that schematically illustrates a distributed storage system, in accordance with an embodiment of the present invention.

FIG. 1 is a block diagram that schematically illustrates a data facility 20 comprising a distributed storage system 22, in accordance with an embodiment of the invention. The particular data facility shown in FIG. 1 is presented to facilitate an explanation of the invention. However, as the skilled artisan will appreciate, the invention can be practiced using other configurations of distributed storage systems with diverse architectures and capabilities.

Facility 20 comprises host computers 26 and nodes 28 that communicate over a network 24. Host computers 26 are coupled to network 24 via a frontend channel 30 (e.g., iSCSI), and nodes 28 are coupled to the network via a backend channel 32. In embodiments of the present invention, distributed storage system 22 comprises nodes 28 and backend channel 32.

In FIG. 1, nodes 28 and their respective components can be differentiated by appending a letter to the identifying numeral, so that the nodes comprise nodes 28A and 28B. In embodiments described herein, a given node 28A may also be referred to as a given frontend node 28A, and a given node 28B may also be referred to as a given backend node 28B. As described hereinbelow, while nodes 28A and 28B comprise storage devices 34 that store data 36, the frontend nodes are configured to receive and process I/O requests from host computers 26.

Each node 28 comprises a computer 38 and one or more storage devices 34. Each computer 38A comprises a frontend processor 40A and a frontend memory 42A that stores a frontend cache 44A, a frontend interface 46A and an I/O request queue 48. Each computer 38B comprises a backend processor 40B and a backend memory 42B that stores a backend cache 44B and a backend interface 46B. As described hereinbelow, processors 40 use caches 44, interfaces 46, and I/O request queues 48 to process I/O requests for data 36 stored in distributed storage system 22.

Storage devices 34 comprise multiple slow and/or fast access time mass storage devices, herein below assumed to be multiple hard disks. FIG. 1 shows cache 44 coupled to a set of storage devices 34. In some configurations, storage devices 34 comprise one or more hard disks, or solid state drives (SSDs) which can have different performance characteristics. In response to an I/O command, a given cache 44, by way of example, may read or write data at addressable physical locations of a given storage device 34. In the embodiment shown in FIG. 1, cache 44 is able to exercise certain control functions over storage devices 34. These control functions may alternatively be realized by hardware devices such as disk controllers (not shown), which are linked to cache 44.

In some embodiments each of storage devices 34 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Frontend interface 46A comprises a software application that is executed by processor 40A and is configured to receive and process I/O requests from host computers 26. Upon receiving an I/O request from a given host computer 26, a given interface 46A identifies a given node 28 that is configured to process the I/O request, and forwards a data request to the given node for processing. In embodiments described herein, a given node 28 is configured to process the I/O request if it stores data 36 referenced by the I/O request. For example the I/O request may comprises a request to write data to a file stored on the given node, or the I/O request may comprise a request to read data from a file stored on the given node. The given node configured to process the I/O request may also be referred to herein as a target node 28.

In a first embodiment, the given node is the same node that received the I/O request. In the first embodiment, the frontend interface 46A processes the I/O request local on the given node and conveys a result of the I/O request to the given host computer 26.

In a second embodiment, the given node comprises a different frontend node 28A. In the second embodiment a first given interface 46A in a first given frontend node 28A receives the I/O request, and conveys a data request to a second given frontend node 28A that stores data 36A referenced by the I/O request. Upon receiving the data request, a second given interface 46A in the second given frontend node processes the data request and conveys a result of the data request to the first given frontend node. Upon receiving the result of the data request, the first given interface 46A conveys a result of the I/O request to the given host computer.

In a third embodiment, the given node comprises a given backend node 28B. In the third embodiment a given interface 46A in a given frontend node 28A receives the I/O request, and conveys a data request to a given backend node 28B that stores data 36B referenced by the I/O request. Upon receiving the data request, a given interface 46B in the given backend node processes the data request and conveys a result of the data request to the given frontend node. Upon receiving the result of the data request, the given interface 46A conveys a result of the I/O request to the given host computer.

I/O request queue 48 comprises multiple entries, each of the entries comprising an I/O request 50 and a status 52. Status 52 stores information such as:
  Identities of distributed storage system resources (also referred to herein as resources) to be used by the I/O request, and a respective load that will be generated on each of the identified resources while processing the I/O request (i.e., how much data will be processed by each of the identified resources). Resources for I/O requests are described in the description referencing FIG. 2 hereinbelow.
  Whether the corresponding I/O request is currently queued or being processed.

Processors 40 comprise general-purpose central processing units (CPU) or special-purpose embedded processors, which are programmed in software or firmware to carry out the functions described herein. The software may be downloaded to computers 38 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Figure 2:
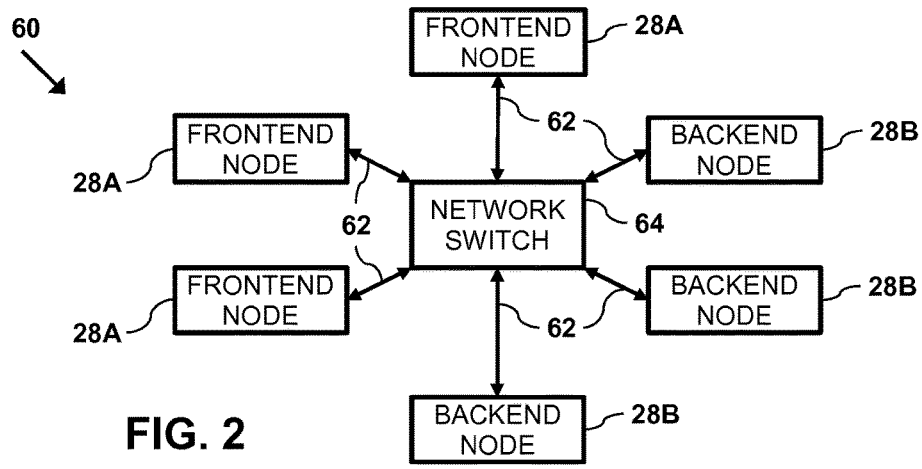
FIG. 2 is block diagram that schematically illustrates the distributed storage system implemented in a star network, in accordance with an embodiment of the present invention.

FIG. 2 is block diagram the schematically illustrates distributed storage system 22 implemented in network 24 comprising a star network 60, in accordance with an embodiment of the present invention. Star network 60 comprises multiple network segments 62, each of the segments coupled to a network switch 64 and a given node 28.

In embodiments described herein, resources of distributed storage system 22 comprise hardware modules and data connections used by nodes 28 and network 24. Therefore, in the example shown in FIG. 2, the resources comprise nodes 28 (and their respective components), network segments and a network device comprising network switch 64. While the configuration in FIG. 2 shows network 60 comprising a single network device comprising network switch 64, other types of network devices are considered to be within the spirit and the scope of the present invention. Examples of other types of network devices include, but are not limited to, network routers, network hubs, network firewalls, compression servers and encryption servers. Additionally network 60 (and therefore network 24) may comprise multiple networking devices.

As described supra, a given status 52 stores information such as identities of resources to be used by a respective I/O request 50, and how much data will be processed by each of the resources. For example, if a given frontend node 28A receives a request to write one megabyte of data to a first backend node 28B and to mirror the one megabyte of data to a second backend node 28B, the information storage by the given status may include:

- A first given network segment 62 coupling the given frontend node to network switch 64. The first given network segment will transfer two megabytes of data (i.e., one megabyte of data to the first given backend node and one megabyte of data to the second given backend node) to complete the I/O request.
- A second network segment 62 that couples network switch 64 to the first given backend node. The second given network segment will transfer one megabyte of data to complete the I/O request.
- The first given backend node that will store one megabyte of data to complete the I/O request.
- A third network segment 62 that couples network switch 64 to the second given backend node. The third given network segment will transfer one megabyte of data to complete the I/O request.
- The second given backend node that will store one megabyte of data to complete the I/O request.

Figure 3:
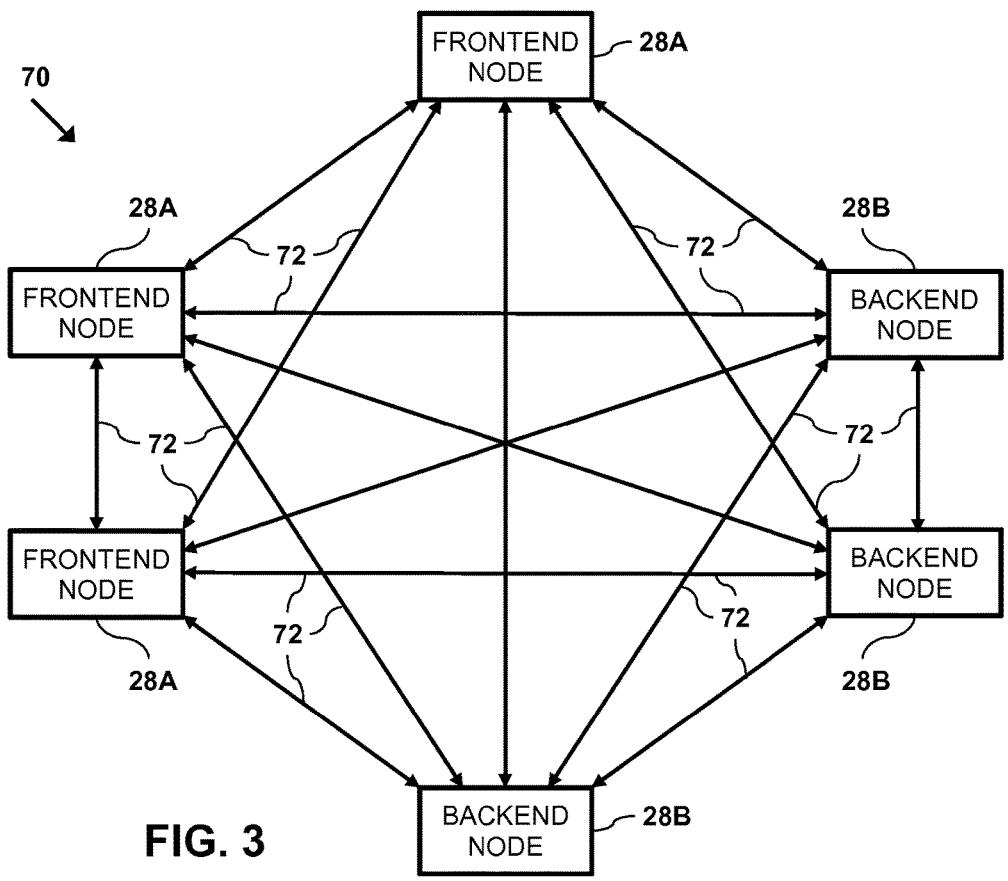
FIG. 3 is a block diagram that schematically illustrates the distributed storage system as a directed graph, in accordance with an embodiment of the present invention.

FIG. 3 is a block diagram that presents distributed storage system 22 as a fully weighted directional graph 70, in accordance with an embodiment of the present invention. Graph 70 comprises nodes 28 and edges 72, wherein each of the edges comprises a logical connection (i.e., first and second network segments 62) that between two of the nodes. In some embodiments, each edge 72 can be weighted based on the current bandwidth (i.e., capacity) available to each of the logical connections.

In the configuration shown in FIG. 3, edges 72 comprise directed edges, which represent the logical backend full duplex channels between the nodes (each directed edge direction represents one half duplex). In some embodiments, each edge 72 has an associated bandwidth capacity, which can be constantly estimated by a set of proxy parameters, along with external information about the system and its limitations (e.g., by either user inputs or by predefined estimations).

Computers 38A can calculate bandwidth utilization in megabytes/second within discrete time slices. For example, internally scheduled tasks add certain values over the time slices during which they are running. Additionally, the integral load for I/O tasks generated by users can be estimated according to a total bandwidth they are expected to generate and speed of the backend channel they are utilizing.

Tracking used bandwidth is typically performed by each frontend node 28A. In some embodiments, upon receiving a new I/O request, a given frontend node 28A checks a number of open requests it has to a given target node 28, and more specifically the accumulated bandwidth utilized for each directed edge 72. The given frontend node can add the bandwidth over these directed edges generated by background processes. Any requests that exceed a defined threshold are then enqueued, and dequeued as soon as enough free bandwidth is available on all relevant distributed storage system resources. This includes first hops from the given frontend node to the target node and any expected subsequent hops to other target nodes 28 along the way.

In some embodiments, the amount of bandwidth to reserve for each I/O request can be dependent on the SCSI command type invoked by the I/O request. For example, if distributed storage system 22 writes two copies of every data, then the given frontend node can check to see which target nodes 28 are the recipients for each data "slice" originating from itself.

In additional embodiments, upon processing I/O requests, frontend nodes 28A can distribute real-time information comprising respective loads on each node 28 and each edge 72 while processing the I/O requests. While advantages of this alternative embodiment include enhanced accuracy and better resolution, disadvantages include more overhead generated by the distribution of the real-time information. However, the additional overhead may be minimized and possibly eliminated since nodes 28 can account for any additional hops that they (i.e., the nodes) directly generate.

Processor 40A can estimate the available bandwidth on each directional edge 72 as follows:
1. Start with an estimation based on reported quality of service (QOS)/available theoretical bandwidth expected on the specific hardware and environment.
2. Monitor packet drops and lowering the estimation when packet drops occur.
3. If a defined timeout has expired without packet drops and the estimation has been lowered, raise it back by one step (up to a maximum of the original definitions).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Interconnect Channel Management

Figure 4:
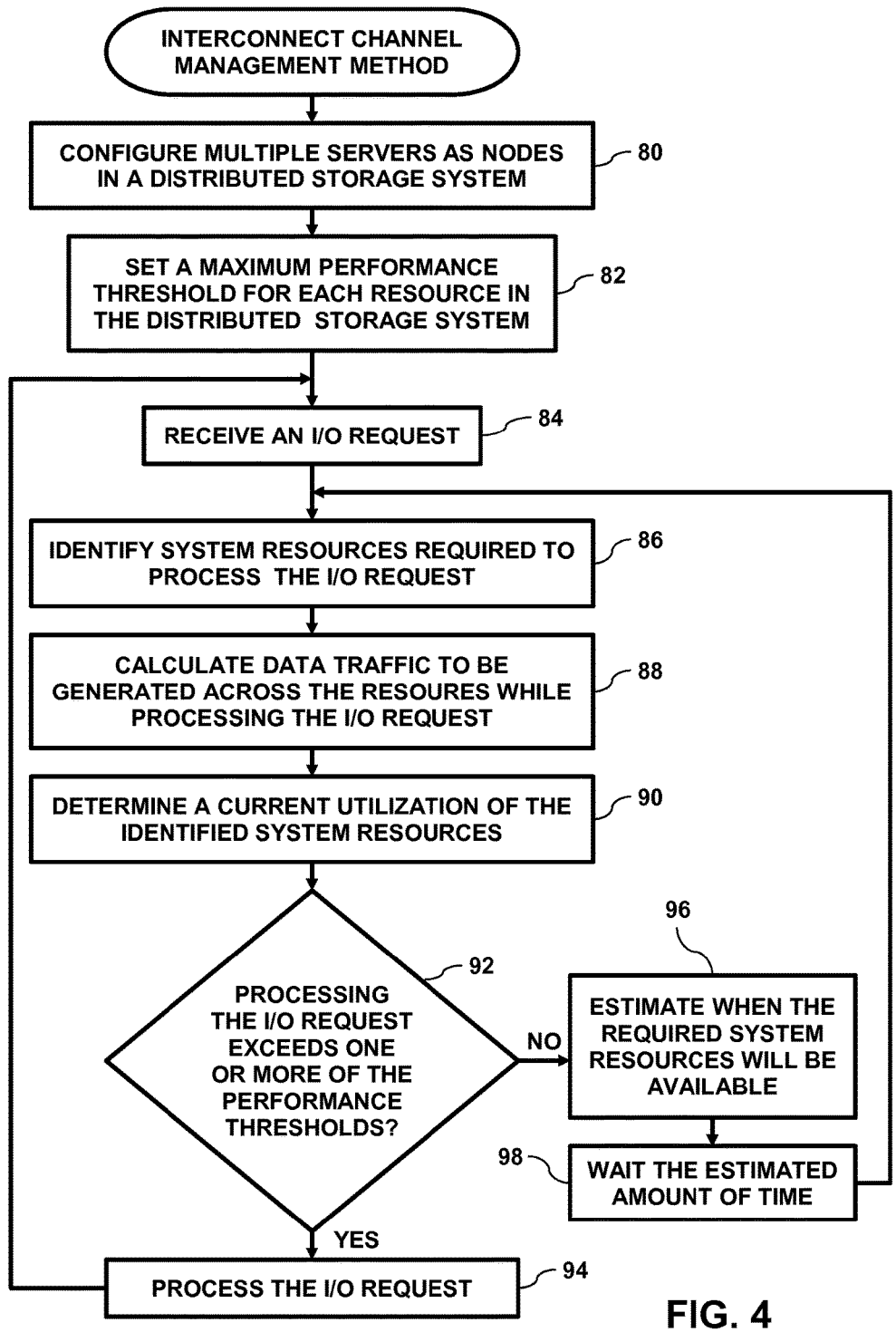
FIG. 4 is a flow diagram that schematically illustrates a method of scheduling input/output operations in order to prevent and overloading of an interconnect channel in the distributed storage system, in accordance with an embodiment of the preset invention.

FIG. 4 is a flow diagram that schematically illustrates a method of distributed storage system 22 to manage backend channel 32 while processing input/output operations, in accordance with an embodiment of the preset invention. In a first configuration step 80, nodes 28 are configured as distributed storage system 22, and in a second configuration step 82, a respective maximum performance threshold (also referred to herein as a capacity) is set for each of the resources in the distributes storage system.

In the configurations shown in FIGS. 1 and 2, the resources comprise nodes 28, network segments 62 and network switch 64. The maximum performance threshold for network segments 62 and network switch 64 may comprise a maximum bandwidth in the switch and each of the segments. The maximum performance threshold for nodes 28 may comprise a maximum data throughput (i.e., maximum read/write performance) for each of the nodes. In some embodiments, the performance threshold for nodes 28 can be broken down to performance threshold of their respective components (e.g., processors 40 and storage devices 34).

In a receive step 84, a given processor 40A receives an I/O request, and in an identification step 86, the given frontend processor identifies resources in distributed storage system 22 that will be employed to perform the I/O request. In a calculation step 88, the given frontend processor calculates respective loads (i.e., how much data traffic) will be generated on each the identified resources by processing the I/O request. For example, if the I/O request comprises a request to perform a mirrored one megabyte write operation to two additional nodes 28, performing the write request will generate two megabytes of network traffic, and account for two separate one megabyte write operations on each of the additional nodes.

In a determination step 90, the given frontend processor determines a current utilization of each of the identified resources (i.e., with respect to their respective performance thresholds). Additionally, for each background process utilizing the backend, the given frontend processor can also calculate a generated load on each node's available bandwidth, including the generated load on intermediate limitations (e.g., the minimal defined bandwidth limitations on network hubs/switches along the way). In some embodiments, the given frontend processor can execute a separate process that monitors current active I/O tasks and background processes, and maintains an estimate of bandwidth currently being utilized on each node 28 according to the current active I/O tasks and background processes, and updates the estimate upon a given I/O operation starts or finishes.

In a comparison step 92, if processing the I/O request does not exceed any of the performance thresholds of the identified resources, then the given frontend processor processes the I/O request in a perform step 94, and the method continues with step 84. If, however, processing the I/O request will result in any of the performance thresholds of the identified resources being exceeded, then in an estimation step 96, the given frontend processor estimates an amount of time until the resources are all free to perform the I/O request (i.e., when performing the I/O request will not exceed any of the performance thresholds of the identified resources).

In a delay step 98, the given frontend processor waits the estimated amount of time, and the method continues with step 86. In some embodiments, the given frontend processor can add the I/O request to a queue (not shown) in memory, and dequeue (and then process) the queued I/O after the estimated amount of time. In other words, the given frontend processor can wait "long enough" for any I/O operations that are already in progress operations to have "probably finished", and then dequeue the given I/O request (or a given I/O request at the front of the queue) for processing.

In additional embodiments, a given node 28A can postpone processing I/O operations when the given node's I/O channel(s) reaches a predefined threshold, and resume processing I/O operations upon determining that all the resources in distributed storage system 22 that are to be utilized in the I/O operation have enough free bandwidth available. In further embodiments, a given processor 40 can throttle, according to a current state of distributed storage system 22, any non-critical internal tasks that generate load on backend channel 32. In supplemental embodiments, a given processor 40 can prioritize, in a similar manner to user I/O jobs (which could also be prioritized internally), critical internal tasks according to their importance.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring distributed storage system resources for a distributed storage system, the distributed storage system resources comprising a network comprising a plurality of network segments, multiple nodes coupled to the network, and one or more network devices coupled to the network;
receiving, by a given node of the distributed storage system, an input/output (I/O) request;
identifying one or more of the distributed storage system resources required to process the I/O request;
calculating a respective load that the I/O request will generate on each of the identified distributed storage system resources; and
processing the I/O request upon detecting that the respective loads are less than respective available capacities of the identified distributed storage system resources; wherein a respective capacity is defined for each of the distributed storage system resources; and further wherein detecting that the respective loads are less than respective available capacities of the distributed storage system resources comprises identifying, by the given node, one or more processes currently employing the identified distributed storage system resources, and determining, for each of the one or more processes, a respective utilization for each of the identified distributed storage system resources.

2. The method according to claim 1, wherein each of the nodes is selected from a list consisting of a frontend node and a backend node, and wherein the given node comprises a given frontend node.

3. The method according to claim 1, and comprising determining a respective amount of time each of the processes will be employing each of the identified distributed storage system resources.

4. The method according to claim 3, and comprising, upon detecting that the respective loads are greater than respective available capacities of the identified distributed storage system resources, determining, based on the respective amounts of time, a subsequent time when the respective loads will be less than respective available capacities of the identified distributed storage system resources, and scheduling the I/O request for processing at the subsequent time.

5. A distributed storage system, comprising:
multiple distributed storage system resources comprising a network of multiple network segments, multiple nodes coupled to the network, and one or more network devices coupled to the network, a given node being configured:
to receive an input/output (I/O) request;
to identify one or more of the distributed storage system resources required to process the I/O request;
to calculate a respective load that the I/O request will generate on each of the identified one or more distributed storage system resources; and
to process the I/O request upon detecting that the respective one or more loads are less than respective one or more available capacities of the one or more identified distributed storage system resources; wherein a respective capacity is defined for each of the distributed storage system resources; and further wherein the given node is configured to detect that the respective loads are less than respective available capacities of the distributed storage system resources by identifying, by the given node, one or more processes currently employing the identified distributed storage system resources, and determining, for each of the one or more processes, a respective utilization for each of the identified distributed storage system resources.

6. The distributed storage system according to claim 5, wherein each of the nodes is selected from a list consisting of a frontend node and a backend node, and wherein the given node comprises a given frontend node.

7. The distributed storage system according to claim 5, wherein the given node is configured to determine a respective amount of time each of the processes will be employing each of the identified distributed storage system resources.

8. The distributed storage system according to claim 7, wherein, upon detecting that the respective loads are greater than respective available capacities of the identified distributed storage system resources, the given node is configured to determine, based on the respective amounts of time, a subsequent time when the respective loads will be less than respective available capacities of the identified distributed storage system resources, and to schedule the I/O request for processing at the subsequent time.

9. A computer program product, the computer program product comprising:
a non-transitory computer readable storage medium having computer readable program code embodied therewith, the computer readable program code comprising:
computer readable program code configured to arrange distributed storage system resources for a distributed storage system, the distributed storage system resources comprising a network comprising a plurality of network segments, multiple nodes coupled to the network, and one or more network devices coupled to the network;
computer readable program code configured to receive, by a given node, an input/output (I/O) request;
computer readable program code configured to identify one or more of the distributed storage system resources required to process the I/O request;
computer readable program code configured to calculate a respective load that the I/O request will generate on each of the identified distributed storage system resources; and
computer readable program code configured to processing the I/O request upon detecting that the respective loads are less than respective available capacities of the identified distributed storage system resources; wherein a respective capacity is defined for each of the distributed storage system resources; and further wherein the computer readable program code is configured to detect that the respective loads are less than respective available capacities of the distributed storage system resources by identifying, by the given node, one or more processes currently employing the identified distributed storage system resources, and determining, for each of the one or more processes, a respective utilization for each of the identified distributed storage system resources.

10. The computer program product according to claim 9, wherein each of the nodes is selected from a list consisting of a frontend node and a backend node, and wherein the given node comprises a given frontend node.

11. The computer program product according to claim 9, and comprising computer readable program code configured to determine a respective amount of time each of the processes will be employing each of the identified distributed storage system resources, and, upon detecting that the respective loads are greater than respective available capacities of the identified distributed storage system resources, to determine, based on the respective amounts of time, a subsequent time when the respective loads will be less than respective available capacities of the identified distributed storage system resources, and to schedule the I/O request for processing at the subsequent time.

* * * * *